UNITED STATES PATENT OFFICE.

EDWARD DICKSON, OF SWANTON, VERMONT, ASSIGNOR TO THE ROBIN HOOD POWDER COMPANY, OF SAME PLACE.

EXPLOSIVE.

SPECIFICATION forming part of Letters Patent No. 678,360, dated July 16, 1901.

Application filed October 18, 1900. Serial No. 33,503. (No specimens.)

*To all whom it may concern:*

Be it known that I, EDWARD DICKSON, a subject of the Queen of Great Britain, residing at Swanton, in the county of Franklin and State of Vermont, have invented new and useful Improvements in Explosive Powders, of which the following is a specification.

My invention relates to explosive powders, particularly gunpowders, and is designed more especially as an improvement upon the powder forming the subject-matter of my Letters Patent No. 567,536, of September 8, 1896.

It consists of the following ingredients, combined in about the proportions stated, viz: ammonium picrate, 33.5 per cent.; potassium picrate, 15.5 per cent.; barium nitrate, 39.5 per cent.; wood-flour, 9.5 per cent.; wheat-flour, 1.25 per cent.; lampblack, .25 per cent., and ferrocyanid of potassium, .50 per cent.

All of the ingredients above mentioned are preferably used in a powdered state.

In making the ammonium picrate ammonia is sprayed over picric acid in about the proportions of 2.5 gallons of ammonia to one hundred pounds of acid, and incident to the spraying the acid is continuously agitated.

In making the potassium picrate potash carbonate or potash bicarbonate, preferably the former, is dissolved in water. Picric acid is dissolved in boiling water and is commingled with the solution of potash. The product is then dried and reduced to a powder, when it is ready for use as an ingredient of the composition before specified.

In manufacturing the powder the ingredients are thoroughly mixed in a suitable apparatus, and the mass is then moistened by a paste composed of gum-arabic or gum-tragacanth and water in suitable proportions and kneaded into a stiff dough or paste. It is then granulated, and the grains are rounded and hardened in any approved manner. After the powder is granulated and dried the grains or globules are preferably rendered non-absorbent by coating them with a compound composed of the ingredients and prepared in the manner which will now be described. In preparing said compound I pour three fluid ounces of nitric acid into one gallon of petroleum and agitate the mixture and then permit it to stand for about thirty minutes. I then add three fluid ounces of sulfuric acid to the mixture and after again agitating the same permit it to stand for about thirty minutes. While the mixture is at rest the acids and a dark pitchy substance, the result of the mixture, settle to the bottom of the vessel. The clarified liquid above the settlement is then poured into another vessel, and six fluid ounces of liquid ammonia are added thereto and the mixture allowed to stand about twenty-four hours. The ammonia sinks to the bottom of the vessel, and when the liquid is separated therefrom said liquid is ready for use.

The grains or globules of powder are coated with the liquid described by immersing them in or painting them with the liquid or in any other manner.

My improved powder is cheap and smokeless and while very effective subjects the barrel of the arm used to very little strain or pressure.

Having described my invention, what I claim, and desire to secure by Letters Patent, is—

1. An explosive powder, comprising ammonium picrate, barium nitrate, ferrocyanid of potassium, and potassium picrate.

2. An explosive powder consisting of ammonium picrate, 33.5 per cent., potassium picrate, 15.5 per cent., barium nitrate, 39.5 per cent., flour, 10.75 per cent., lampblack, .25 per cent., and ferrocyanid of potassium, .50 per cent., substantially as specified.

3. An explosive powder comprising ammonium picrate, barium nitrate, ferrocyanid of potassium, and potassium picrate; the said powder being reduced to a granular state and then coated with petroleum, previously subjected to the action of nitric acid, sulfuric acid and ammonia, substantially as specified.

4. An explosive powder consisting of ammonium picrate, 33.5 per cent., potassium picrate, 15.5 per cent., barium nitrate, 39.5 per cent., flour, 10.75 per cent., lampblack, .25 per cent., and ferrocyanid of potassium, .50 per cent.; the said powder being reduced to a granular state, and then coated with petroleum, previously subjected to the action of nitric acid, sulfuric acid and ammonia, substantially as specified.

In testimony whereof I have hereunto set my hand in presence of two subscribing witnesses.

EDWARD DICKSON.

Witnesses:
 EDWIN H. RICHARDSON,
 ADDIE E. STOWE.